No. 791,443. PATENTED JUNE 6, 1905.
A. ANDRESEN.
CAKE IRON.
APPLICATION FILED DEC. 13, 1904.
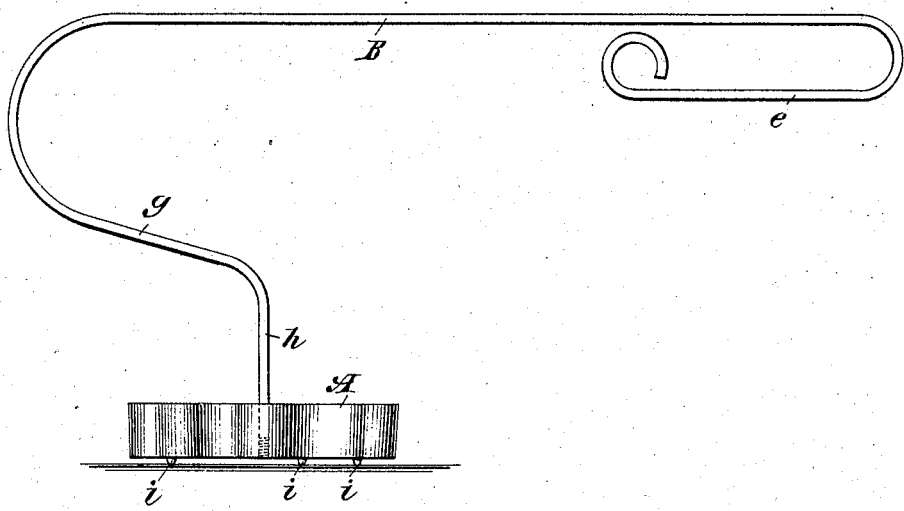
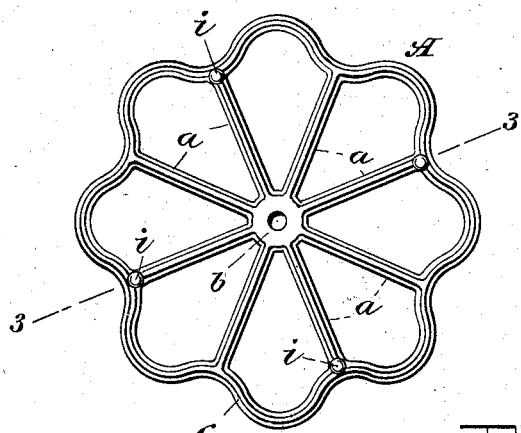
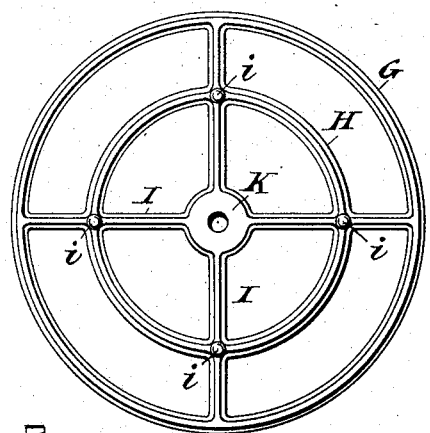
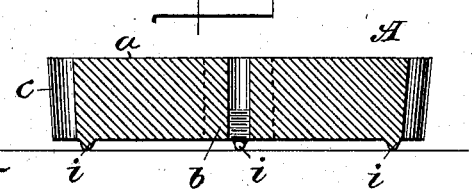
WITNESSES:
M. Van Nortwick
N. B. Smith
INVENTOR
Alfred Andresen
BY George Cook
ATTORNEY No. 791,443. Patented June 6, 1905.

UNITED STATES PATENT OFFICE.

ALFRED ANDRESEN, OF MINNEAPOLIS, MINNESOTA.

CAKE-IRON.

SPECIFICATION forming part of Letters Patent No. 791,443, dated June 6, 1905.

Application filed December 13, 1904. Serial No. 236,745.

*To all whom it may concern:*

Be it known that I, ALFRED ANDRESEN, a citizen of the United States, and a resident of Minneapolis, in the county of Hennepin and State of Minnesota, have made and invented certain new and useful Improvements in Cake-Irons, of which the following is a specification.

My invention relates to an improvement in cake-irons, the object being to produce an article of this kind which while adapted for cooking cakes of certain kinds may at the same time be conveniently handled without danger of burning the hand or hands of those using it and which may also be packed in a small compass for transportation.

A further object of my invention is to so construct and arrange the several parts that while the iron having the batter adhering thereto is submerged in a vessel of melted lard it will remain in its proper position without the necessity of holding it, and, further, will be sufficiently elevated above the bottom of the vessel to allow of the batter being properly cooked on the lower side or surface thereof.

With these and other ends in view my invention consists in certain novel features of construction, as will be hereinafter fully described, and pointed out in the claims.

In the accompanying drawings, Figure 1 is a view in elevation of my improved cake-iron, having the handle attached thereto. Fig. 2 is a bottom plan view of one form of the iron, the handle being detached. Fig. 3 is a sectional view thereof, taken on the line 2 2 of Fig. 1. Fig. 4 is a view of a modified form of the iron.

Referring to the drawings, A represents the iron proper of any desired configuration, but preferably formed with arms or plates $a$, radiating from the hub $b$ to the scalloped outer plate $c$, the metal of which the iron is formed being considerably thicker at the upper edge or surface than at the lower, as illustrated in the several figures of the drawings, in order that the cake when cooked may be easily removed from the iron.

As illustrated in Fig. 3, the hub $b$ is partially threaded and into which is screwed one end of the handle B, said handle being made of a single piece of wire and bent to form the handle proper, $e$, and also curved to form the loop $g$, the latter terminating in the vertical arm $h$, threaded, as before described, on its extreme end to engage with the threaded hub of the iron, the several bends in the wire being made in the same vertical plane in order that the handle may lie flat when packed for transportation. By forming the loop or bend $g$ to extend over and beyond the iron when the parts are assembled it will be seen that said iron will remain in its upright position, the weight of the handle being so distributed that all danger of the iron tilting or falling over is overcome.

In Fig. 4 I have shown a modified form of the iron, consisting of the two concentric rings G H, joined by the spokes I, the latter terminating in the hub K, the whole being made of one casting.

On the under side of the iron I provide the lugs or projections $i$, preferably at points where the arms $a$ join the outer scalloped plate $c$, or, as shown in the modified form in Fig. 4, at points where the spokes I join with one of the concentric rings, the object and purpose of these lugs or projections being to slightly elevate the lower side or surface of the iron above the pan or vessel in which it rests when in use.

In practice the iron is first dipped into melted lard and thoroughly heated, after which it is dipped into a batter, the latter clinging to both sides or surfaces of the outer plate or plates and to the surfaces of the arms or plates $a$. The iron is then placed in a pan or vessel of hot melted lard until the batter clinging to the iron is sufficiently cooked, whereupon it is removed and the cake allowed to fall or drop from the iron onto a plate or proper receptacle, the handle, as before described, being so shaped as to allow the iron to rest in its proper position on the bottom of the pan or vessel without tilting. It will of course be understood that in dipping the heated and greased iron into the batter care should be taken that it be not completely submerged, as in such instance the batter would cling to the upper surface of the iron and render it impossible to detach the cooked cake therefrom without first scraping or cutting off the upper surface.

It will of course be apparent that the shape or configuration of the iron may be changed at will, my invention being in no way limited to the particular design shown, it being essential only that it be constructed with arms or plates with spaces between them in order that the batter may adhere to both sides or surfaces thereof.

By bending the handle into the shape shown and threading the same into the hub of the iron it is apparent that when not in use the two parts may be detached and packed away in a small compass.

Having fully described my invention, what I claim as new, and desire to secure by Letters Patent, is—

1. A cake-iron constructed with a hub and arms or plates radiating therefrom, and having lugs or projections formed on the under side thereof, and a handle detachably secured to said hub, substantially as described.

2. A cake-iron constructed with a threaded hub having arms or plates radiating therefrom and a circular plate or plates connecting said arms, and provided with lugs or projections on which the iron rests, and a handle detachably secured to said iron and provided with a loop in its length overhanging said iron, whereby to balance the latter, substantially as described.

Signed at Minneapolis, in the county of Hennepin and State of Minnesota, this 26th day of November, A. D. 1904.

ALFRED ANDRESEN.

Witnesses:
A. RUSS,
GEORGE BRATH.